United States Patent
Ye (12)

(10) Patent No.: US 6,581,845 B2
(45) Date of Patent: Jun. 24, 2003

(54) CHIP-BASE PLASTIC CURRENCY WITH CASH AMOUNT LOADING FUNCTION

(76) Inventor: Ri-Ju Ye, No. 27, Alley 13, Lane 40, Shuang-Lian St., Long-Tan Shiang, Taoyuan Shian (TW)

( * ) Notice: Subject to any disclaimer, the term of this patent is extended or adjusted under 35 U.S.C. 154(b) by 0 days.

(21) Appl. No.: 09/902,402

(22) Filed: Jul. 11, 2001

(65) Prior Publication Data

US 2003/0010831 A1 Jan. 16, 2003

(51) Int. Cl.[7] .................................................. G06F 5/00
(52) U.S. Cl. ......................................... 235/492; 705/72
(58) Field of Search .............................. 235/492; 705/72

(56) References Cited

U.S. PATENT DOCUMENTS

| | | | | |
|---|---|---|---|---|
| 4,007,355 A | * | 2/1977 | Moreno | 235/379 |
| 6,078,908 A | * | 6/2000 | Schmitz | 705/50 |
| 2001/0005840 A1 | * | 6/2001 | Verkama | 705/67 |
| 2002/0007352 A1 | * | 1/2002 | Fieschi et al. | 705/72 |

OTHER PUBLICATIONS

Jose Zoreda and Jose Oton, "Smart Cards" 1994, pp. 35–36, 73–74, and 139–145.*

"1998 Advanced Card Technology Sourcebook" published by Faulkner and Gray, 1997, pp. 62–64 and 129–133.*

* cited by examiner

*Primary Examiner*—Mark Tremblay
(74) *Attorney, Agent, or Firm*—Charles E. Baxley

(57) ABSTRACT

A chip-based plastic currency comprising a plastic cash card issued to the cardholder by an issuing bank, and an IC chip implanted in the plastic cash card for the loading of an amount of cash repeatedly, for enabling the plastic cash card to be re-useable. The amount of cash to be loaded in the IC chip is determined subject to the amount of money of cash paid in advance by the cardholder, or the amount of money deducted in advance from the savings account of the cardholder in the issuing bank.

9 Claims, 3 Drawing Sheets

CHIP-BASE PLASTIC CURRENCY WITH CASH AMOUNT LOADING FUNCTION

BACKGROUND OF THE INVENTION

The present invention relates to plastic currency and, more particularly, to a chip-base plastic currency with cash amount loading function.

For the advantage of ease of carrying and use and the advantage of being free of the risk of carrying a big amount of cash, using a credit card to pay debits has become more and more popular. Almost every adult has at least one credit card. However, because using a credit card to purchase goods needs not to pay cash immediately, people may spend too much beyond one can afford. When advancing an amount of money from the credit account, one has to pay much money for the interest. In case one spends too much beyond one can afford, a bad debt occurs, and one's personal credit is destroyed. Further, credit card users may forget to remit the payment before the deadline due to any of a variety of reasons. Delay of a payment may invite a penalty. The issuing bank suffers from a bad debt if the cardholder does not have money to pay the payment consumed. If the credit card is lost, other persons may use it illegally. During a credit card transaction, the code and stored data of the credit card may be copied illegally for making a counterfeit.

SUMMARY OF THE INVENTION

The present invention has been accomplished to provide a chip-base plastic currency, which eliminates the aforesaid problems. According to one aspect of the present invention, the chip-base plastic currency comprises a plastic cash card issued to the cardholder by an issuing bank, and an IC chip implanted in the plastic cash card for the loading of an amount of cash repeatedly, for enabling the plastic cash card to be re-usable. According to another aspect of the present invention, the amount of cash to be loaded in the IC chip is determined subject to the amount of cash paid in advance by the cardholder, or the amount of money deducted in advance from the savings account of the cardholder in the issuing bank.

DETAILED DESCRIPTION OF THE PREFERRED EMBODIMENT

Referring to FIGS. From 1 through 3, a chip-base plastic currency is a plastic cash card issued by a bank and embedded with an IC chip. The chip-base plastic currency can be a disposable type or re-registrable type subject to the data loaded. The so-called disposable type means that the chip-base plastic currency is loaded with a fixed amount (for example, NT$1,000.—) in its IC chip, and it becomes useless and must be thrown away when the loaded amount is used up. The so-called re-registrable type means that the chip-base plastic currency (namely, the chip-base cash card 10) can be repeatedly loaded with a particular amount of money each time the previously loaded amount of money has been used up. The IC chip of the chip-base cash card 10 is stored with basic data including name and date of birth of the cardholder, card number, application date, allowance of amount of cash, pin (personal identification number) code, etc.

Either the disposable or re-registrable type, the IC chip 11 is compatible to different application programs so that the user can select the items to which a payment is to be paid, for example, payment for regular purchase, free-way fee, parking fee, movie ticket, on-line purchase, mass transportation vehicles, public phone, and etc.

Figure 4:
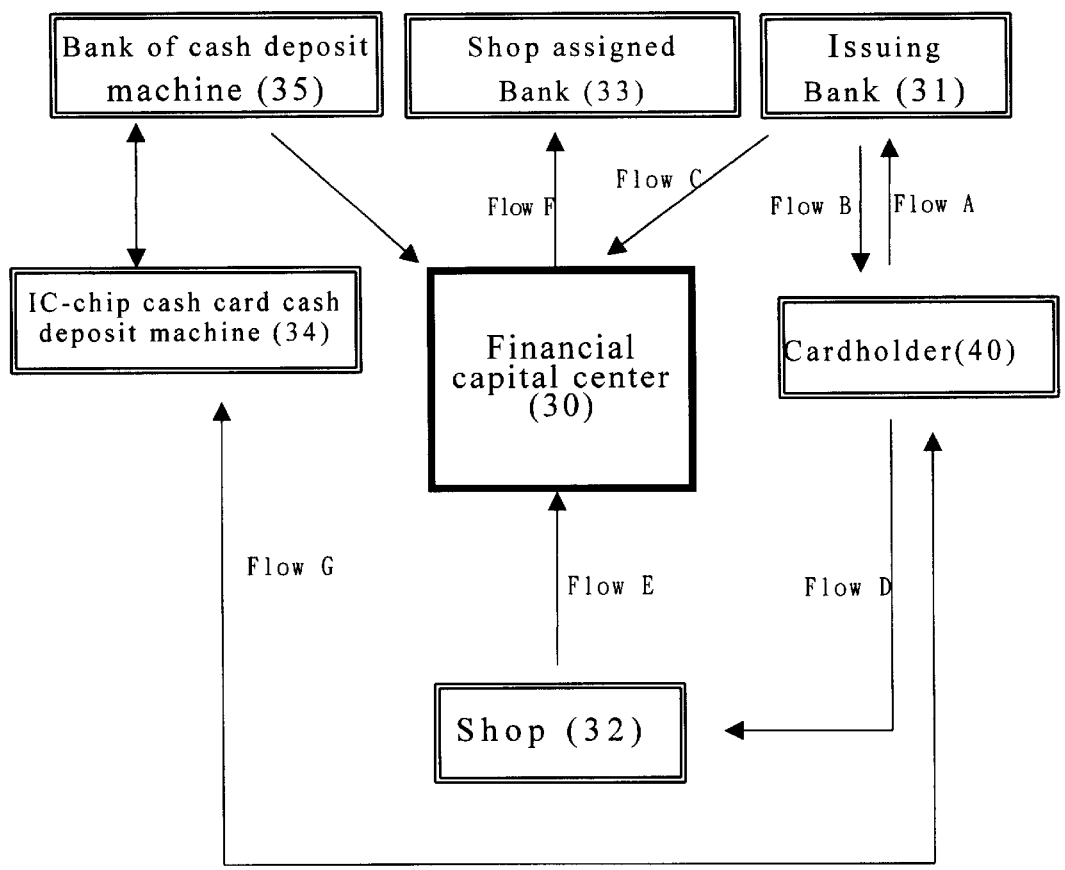
FIG. 4 is a flow chart explaining the transaction of the chip-base plastic currency according to the present invention.

The application and transaction flow of the present invention is outlined hereinafter with reference to FIG. 4. A number of banks organize a financial capital center 30, and become members of the financial capital center 30. An applicant applies to one of the members of the financial capital center 30, namely, the issuing bank 31 for a chip-base cash card 10, and becomes the cardholder 40 of the respective chip-base cash card 10 when allowed (Flow A). Before issuing to the cardholder 40, the issuing bank 31 loads a particular amount of cash in the IC chip 11 of the chip-base cash card 20 subject to request of the cardholder 40 (Flow B). The cardholder 40 can give cash to the issuing bank 31 subject to the amount of cash to be loaded in the IC chip 11 before obtaining the chip-base cash card 10. Alternatively, the issuing bank 31 can deduct the amount of cash loaded in the IC chip 11 from the savings account of the cardholder 40 in the issuing bank 31, i.e., the allowance of cash loaded in the IC chip 11 is determined subject to the amount of cash or savings owned by the cardholder 40. After issuing of the chip-base cash card 10 to the cardholder 40, and the issuing bank 31 is requested to remit equal amount to the financial capital center 30 (Flow C). In case the cardholder 40 uses up food, clothing, or other goods or services, in a shop 32 with the chip-base cash card 10, the shop 32 uses a card reader 20 to read the data loaded in the chip-base cash card 10 and to deduct the consumed amount from the allowance loaded in the IC chip 11 of the chip-base cash card 10 (Flow D). The shop 32 sends a debit note to the financial capital center 30 for payment periodically subject to transactions occurred (Flow E). The financial capital center 30 remits the amount of the debit note to the account of the shop 32 in its bank 33 when examined (Flow F).

If the balance left in the chip-base cash card 10 is insufficient, the cardholder 30 can go to an assigned IC-chip cash card cash deposit machine (auto teller machine) 34 to deposit cash (Flow G), i.e., the cardholder 40 uses the IC-chip cash card cash deposit machine (auto teller machine) 34 to load a certain amount of cash in the IC chip 11 of the chip-base cash card 10, enabling the bank 35 of the IC-chip cash card cash deposit machine (auto teller machine) 34 to collect payment from the account of the cardholder 40 in the issuing bank 31 subject to the basic data stored in the IC chip 11 of the chip-base cash card 10, and then to remit the collected payment to the financial capital center 30, and then to load the corresponding amount of cash in the IC chip 11 of the chip-base cash card 10 (Flow H). Thus, the cardholder 40 can use the chip-base cash card 10 to enjoy consuming again. If the balance in the account of the cardholder 40 in the issuing bank 31 is insufficient to pay the amount of cash to be loaded in the IC chip 11 of the chip-base cash card 10, the IC-chip cash card cash deposit machine (auto teller machine) 34 rejects the chip-base cash card 10. In this case, the cardholder 40 must pay sufficient cash to the issuing bank 31 or deposit sufficient cash in his or her savings account in the issuing bank 31, for allowing the desired amount of cash to be loaded in the IC chip 11 of the chip-base cash card 10 in the IC-chip cash card cash deposit machine (auto teller machine) 34.

Upon each transaction between the cardholder 40 and the shop 32 through the chip-base cash card 10, the financial capital center 30 uses the mobile phone of the cardholder 40 to confirm the pin code and to forward message to the cardholder 40, i.e., the financial capital center 30 calls the mobile phone of the cardholder 40 upon each transaction, and confirms the personal identification of the cardholder 40, the amount consumed, and the amount of balance. If the cardholder 40 lost the chip-base cash card 10, the cardholder 40 needs to apply to the issuing bank 31 to cancel the chip-base cash card 10. In case the chip-base cash card 10 is stolen and illegally used by another person, the cardholder 40 immediately knows the transaction through his/her mobile phone during the transaction, and can ask the financial capital center 30 to stop the transaction through his/her mobile phone. Therefore, the chip-base cash card 10 achieves zero-risk when lost.

As indicated above, the invention provides numerous advantages as follows:

1. Because the registered value of allowance of the chip-base cash card 10 is paid in advance by cash or the savings account of the cardholder 40, the cardholder 40 needs not to pay annual fee and never consumes over the set allowance, and the bank is free from the risk of irrecoverable credits.
2. Because the financial capital center 30 contacts the cardholder 40 to confirm the personal identification and amount consumed, it is risk-free to use the chip-base cash card 10.
3. The chip-base cash card 10 provides another way of using cash to people having a bad credit record.
4. The chip-base cash card 10 effectively controls the cardholder 40 from over-consuming, i.e., the cardholder 40 uses the chip-base cash card 10 to consume goods and services within the affordable range and, the bank is free from any risk of bad debts.
5. Counterfeit of the chip-base cash card 10 is useless because a mobile telephone check procedure is needed during each transaction.
6. Because each transaction is immediately paid by cash, the shop receiving the transaction is free from the embarrassment of financing.

Figure 1:
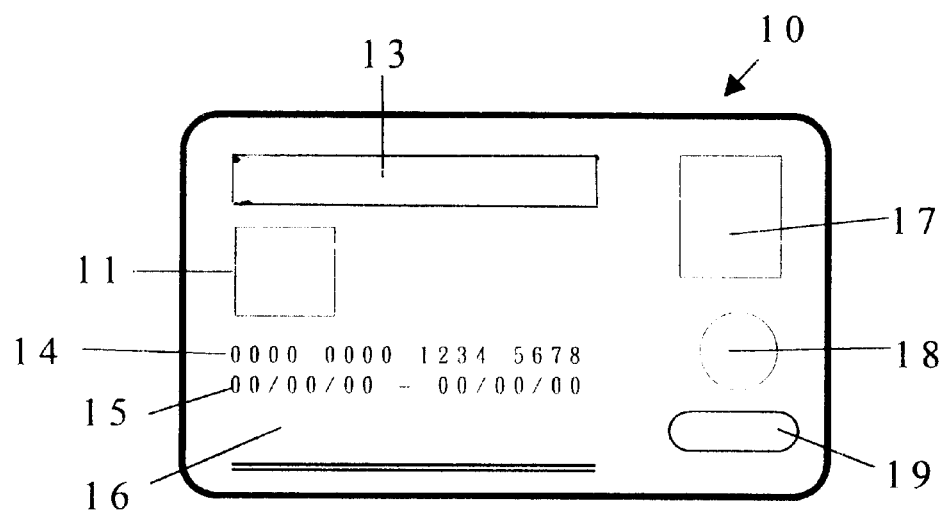
FIG. 1 is a front view of the chip-base plastic currency according to the present invention.
Figure 2:
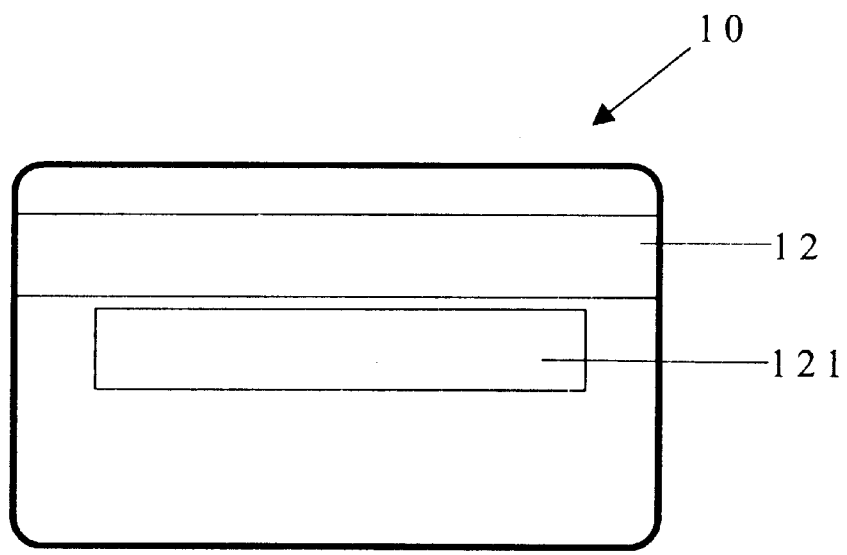
FIG. 2 is a back view of the chip-base plastic currency according to the present invention.
Figure 3:
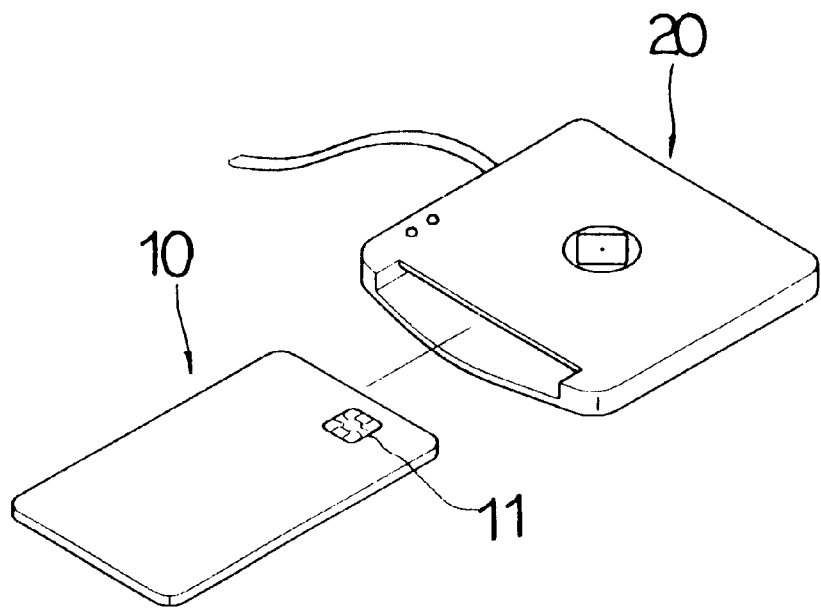
FIG. 3 illustrates the outer appearance of the card reader for use with the chip-base plastic currency according to the present invention.

Because the card reader 20 may be not popular in particular areas, the IC chip 11 can be implanted in the credit card, i.e., the chip-base cash card 10 can be made having an IC chip 11 and a credit card magnetic strip 12 (see FIGS. 1 and 2). Further, the chip-base cash card 10 has on its front side the bank's trademark 13, the card number 14, the date of valid from and good through 15, the cardholder's name 16, the cardholder's photo 17, a counterfeit protective laser label 18, and the global registered trademark 19 (see FIG. 1). When incorporated with credit card, the chip-base cash card 10 has on its backside a magnetic strip 12, and an area for authorized signature 121.

A prototype of chip-base plastic currency with cash amount loading function constructed with the features of FIGS. 1~4. The chip-base plastic currency with cash amount loading function functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A chip-based plastic currency comprising a plastic cash card issued to the cardholder by an issuing bank, and an IC chip implanted in said plastic cash card for the loading of an amount of cash repeatedly, for enabling said plastic cash card to be re-useable, when the cardholder uses the chip-based plastic currency to consume goods in a shop, said issuing bank uses the mobile phone of the cardholder to confirm the personal identification code and to send a message upon each transaction.

2. The chip-based plastic currency of claim 1 wherein the amount of cash loaded in said IC chip is smaller than the balance of the savings account of the cardholder in said issuing bank.

3. The chip-based plastic currency of claim 1 wherein the amount of cash loaded in said IC chip is equal to the amount of cash paid by the cardholder to said issuing bank.

4. The chip-based plastic currency of claim 1 wherein said issuing bank is a member of a financial capital center established by banks.

5. The chip-based plastic currency of claim 4 wherein the cash payment paid by the cardholder is remitted to said financing capital center by issuing bank that received the cash payment.

6. The chip-based plastic currency of claim 4 wherein said issuing bank deducts the amount equal to the amount of cash loaded in said IC chip from the savings account of the cardholder, and remits the money of the deducted amount to said financing capital center.

7. The chip-based plastic currency of claim 4 wherein after each transaction done in a shop by the cardholder using the chip-base plastic currency, the shop applies to said financing capital center for payment, and said financing capital center remits the payment to an account in a bank assigned by the shop.

8. The chip-based plastic currency of claim 1 wherein the cardholder is allowed to load a new amount of cash in said IC chip in an assigned cash deposit machine when the balance of amount of cash loaded in said IC chip is insufficient.

9. The chip-based plastic currency of claim 1 wherein said IC chip has an application program built therein for enabling the cardholder to select consuming items payable by the chip-base plastic currency.

* * * * *